(12) United States Patent
Miyamoto

(10) Patent No.: US 7,852,509 B2
(45) Date of Patent: Dec. 14, 2010

(54) IMAGE FORMING APPARATUS AND IMAGE FORMING SYSTEM

(75) Inventor: Satoru Miyamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1294 days.

(21) Appl. No.: 11/393,385

(22) Filed: Mar. 30, 2006

(65) Prior Publication Data

US 2007/0081202 A1 Apr. 12, 2007

(30) Foreign Application Priority Data

Mar. 31, 2005 (JP) .............................. 2005-103414

(51) Int. Cl.
| | |
|---|---|
| *G06K 15/10* | (2006.01) |
| *G06F 15/00* | (2006.01) |
| *G06F 3/12* | (2006.01) |
| *G06K 1/00* | (2006.01) |
| *H04N 1/60* | (2006.01) |
| *H04N 1/40* | (2006.01) |

(52) U.S. Cl. .................... 358/1.5; 358/1.13; 358/1.14; 358/1.15; 358/1.16; 358/1.17; 358/1.1; 358/1.9; 358/461

(58) Field of Classification Search ........ 358/1.13–1.17, 358/1.1, 461, 486, 412, 413, 409, 1.9, 468
See application file for complete search history.

(56) References Cited

U.S. PATENT DOCUMENTS

| | | | | |
|---|---|---|---|---|
| 6,510,302 | B1* | 1/2003 | Konno et al. ............... | 399/208 |
| 6,719,467 | B2* | 4/2004 | Hess et al. .................. | 400/76 |
| 6,972,854 | B1* | 12/2005 | Jung .......................... | 358/1.1 |
| 7,102,797 | B2* | 9/2006 | Sakai ......................... | 358/461 |
| 7,333,230 | B2* | 2/2008 | Sugishita et al. ........... | 358/1.15 |
| 7,382,496 | B2* | 6/2008 | Sugimoto et al. .......... | 358/3.26 |
| 7,535,592 | B2* | 5/2009 | Niitsuma .................... | 358/1.16 |
| 2005/0206970 | A1* | 9/2005 | Kim .......................... | 358/486 |

FOREIGN PATENT DOCUMENTS

JP      2001-334648      12/2001

* cited by examiner

*Primary Examiner*—Thierry L Pham
*Assistant Examiner*—Satwant K Singh
(74) *Attorney, Agent, or Firm*—DLA Piper LLP (US)

(57) ABSTRACT

An image forming apparatus includes (A) an image forming section, (B) a document reading section, and (C) a controller. The image forming section is for forming an image. The document reading section is capable of reading a document concurrently with an operation of the image forming section. The document reading section reads the document by successively shifting a reading position. The controller lowers a speed for shifting the reading position in the document reading section when the image forming section carries out a predetermined operation.

8 Claims, 12 Drawing Sheets

IMAGE FORMING APPARATUS AND IMAGE FORMING SYSTEM

CROSS-REFERENCE TO RELATED APPLICATIONS

The present application claims priority upon Japanese Patent Application No. 2005-103414 filed on Mar. 31, 2005, which is herein incorporated by reference.

BACKGROUND

1. Technical Field

The present invention relates to image forming apparatuses and image forming systems.

2. Related Art

Image forming apparatuses including an image forming section for forming an image and a document reading section for reading a document by successively shifting the reading position are well known. Such an image forming apparatus has a plurality of functions such as a scanner function, a printer function, and a copy function, for example, and is also called as a multi-function printing apparatus (MFP apparatus).

In such an image forming apparatus, it is possible to operate the document reading section concurrently with the image forming section, so as to allow concurrent performance of the plurality of functions (see JP-A-2001-334648).

Incidentally, the image forming section may vibrate when the image forming section performs a certain operation. When the document reading section carries out an operation for reading a document concurrently with the certain operation, the vibration may be transferred to the document reading section, and reading of the document may not be properly performed.

In order to solve the aforementioned problem, a countermeasure has been proposed in which the image forming apparatus is controlled not to start the certain operation of the image forming section until reading of the document is finished. However, when such a countermeasure is adopted, the start of the image forming operation is delayed, which prevents an operator such as a user from immediately obtaining a medium (paper, etc.) on which an image is formed.

Further, as regards the time required from when the operator instructs the apparatus to read a document to when the reading is finished and the time required from when the operator instructs the apparatus to perform image formation to when the operator obtains a medium (paper, etc.) on which an image is formed, the former case often takes more time (in case of a high reading resolution, etc.). Therefore, it is more likely that the operator feels irritated in cases where the time for the latter case becomes long than in cases where the time for the former case becomes long. Accordingly, considering this point, it is required to shorten the time for the latter case as much as possible.

SUMMARY

The present invention has been devised in consideration of these issues, and it is an object thereof to provide an image forming apparatus and an image forming system that can prevent the time from when an operator instructs the apparatus to perform image formation to when the operator obtains a medium on which an image has been formed from being prolonged, while mitigating the problem that reading of a document is not properly performed due to vibration.

A primary aspect of the invention is an image forming apparatus including:
an image forming section for forming an image;
a document reading section capable of reading a document concurrently with an operation of the image forming section, the document reading section reading the document by successively shifting a reading position; and
a controller that lowers a speed for shifting the reading position in the document reading section when the image forming section carries out a predetermined operation.

Other features of the present invention will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DESCRIPTION OF EXEMPLARY EMBODIMENTS

Figure 1:
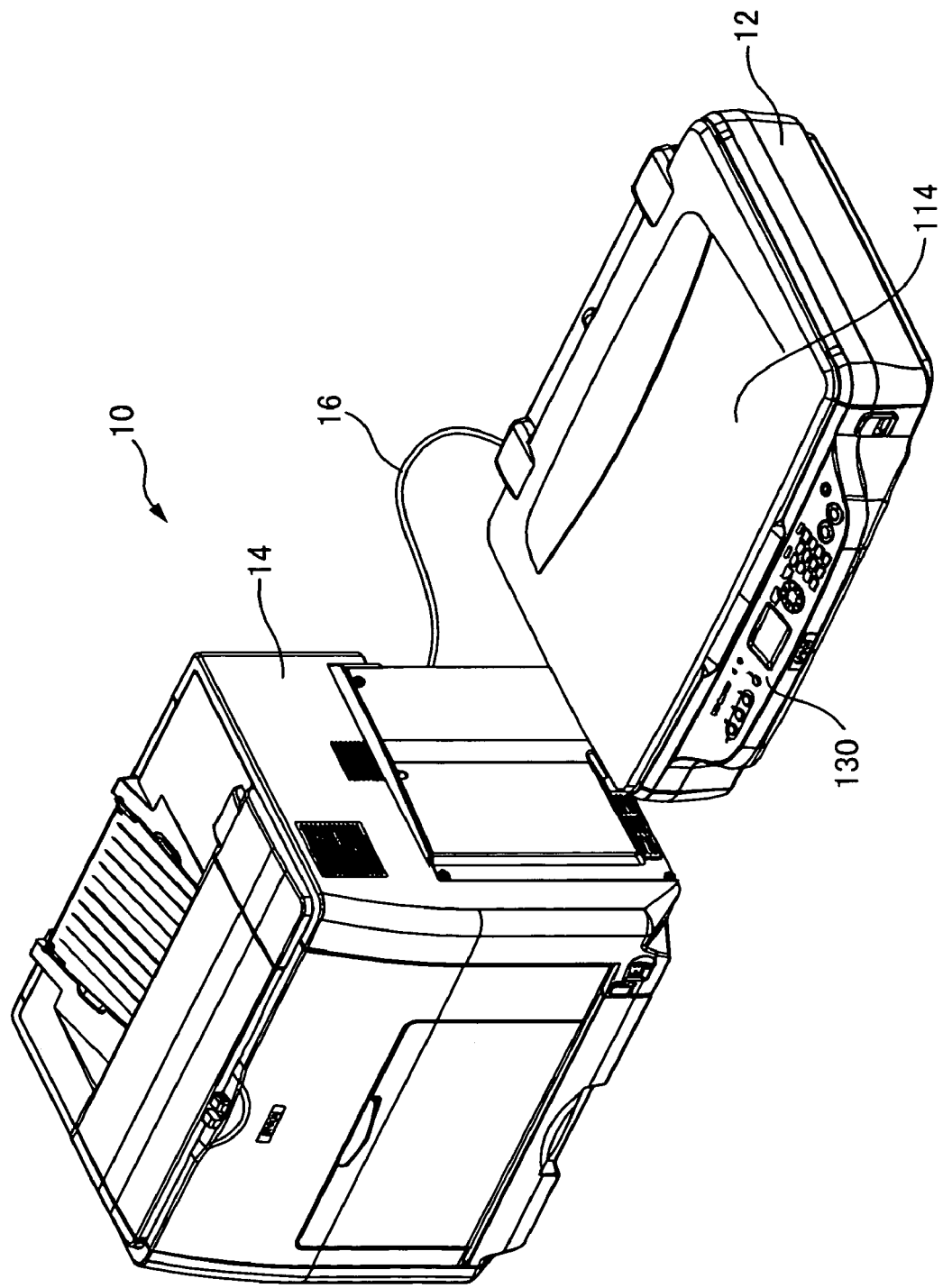
FIG. 1 is a perspective view showing an exemplary external configuration of an MFP apparatus 10.

At least the following matters will be made clear by the explanation in the present specification and the description of the accompanying drawings.

An image forming apparatus includes:

an image forming section for forming an image;

a document reading section capable of reading a document concurrently with an operation of the image forming section, the document reading section reading the document by successively shifting a reading position; and a controller that lowers a speed for shifting the reading position in the document reading section when the image forming section carries out a predetermined operation.

With such an image forming apparatus, it is possible to mitigate the problem that reading of a document is not properly performed due to vibration, as well as prevent the time from when an operator instructs the apparatus to perform image formation to when the operator obtains a medium on which an image has been formed from being prolonged.

Further, the controller may start lowering the speed for shifting the reading position in the document reading section at the same time as starting of the predetermined operation or before starting of the predetermined operation.

With such an image forming apparatus, it is possible to mitigate, more appropriately, the problem that reading of a document is not properly performed due to vibration.

Further, the document reading section may be provided with a moving member for reading an image on the document while moving, and when the image forming section carries out the predetermined operation, the controller may lower a moving speed of the moving member that reads the image.

Further, the controller may determine whether or not to lower the moving speed of the moving member that reads the image when the image forming section carries out the predetermined operation, based on a reading condition for when the moving member reads the image.

With such an image forming apparatus, it is possible to determine, according to a required reading quality, an optimal control of the document reading section for when the document reading section reads a document concurrently with an operation of the image forming section.

Further, when the image forming section carries out the predetermined operation, the controller may first lower the moving speed and then stop the movement of the moving member, to interrupt the reading of the image by the moving member.

With such an image forming apparatus, it is possible to reduce the amount of data, among image data obtained by reading an image, that is affected by vibration.

Further, the controller may determine whether or not to interrupt the reading when the image forming section carries out the predetermined operation, based on a reading condition for when the moving member reads the image.

With such an image forming apparatus, it is possible to determine, according to a required reading quality, an optimal control of the document reading section for when the document reading section reads a document concurrently with an operation of the image forming section.

Further, the controller may restart the reading after feeding the moving member in a reverse direction.

With such an image forming apparatus, it is possible prevent generation of data, among image data obtained by reading an image, that is affected by vibration.

Further, the reading condition may be a reading resolution.

Further, the image forming section may include an image bearing member for bearing a latent image, a plurality of developing devices for developing the latent image, and a rotation section that holds the plurality of developing devices and that rotates to move the developing devices and make a selected one of the developing devices oppose the image bearing member, and the predetermined operation may be a rotational operation of the rotation section.

With such an image forming apparatus, it is possible to mitigate the problem that reading of a document is not properly performed due to vibration generated as a result of the rotational operation of the rotation section, as well as prevent the time from when an operator instructs the apparatus to perform image formation to when the operator obtains a medium on which an image has been formed from being prolonged.

Further, the image forming section may include an image bearing member for bearing a latent image, a plurality of developing devices for developing the latent image, and a rotation section that holds the plurality of developing devices and that rotates to move the developing devices and make a selected one of the developing devices oppose the image bearing member, and the predetermined operation may be an operation to stop the rotation of the rotation section.

With such an image forming apparatus, it is possible to mitigate the problem that reading of a document is not properly performed due to vibration generated as a result of the operation for stopping the rotation of the rotation section, as well as prevent the time from when an operator instructs the apparatus to perform image formation to when the operator obtains a medium on which an image has been formed from being prolonged.

It is also possible to achieve an image forming apparatus including: an image forming section for forming an image; a document reading section capable of reading a document concurrently with an operation of the image forming section, the document reading section reading the document by successively shifting a reading position; and a controller that lowers a speed for shifting the reading position in the document reading section when the image forming section carries out a predetermined operation, wherein the controller starts lowering the speed for shifting the reading position in the document reading section at the same time as starting of the predetermined operation or before starting of the predetermined operation, wherein the document reading section is provided with a moving member for reading an image on the document while moving, wherein, when the image forming section carries out the predetermined operation, the controller lowers a moving speed of the moving member that reads the image, wherein the controller determines whether or not to lower the moving speed of the moving member that reads the image when the image forming section carries out the predetermined operation, based on a reading condition for when the moving member reads the image, wherein, when the image forming section carries out the predetermined operation, the controller first lowers the moving speed and then stops the movement of the moving member, to interrupt the reading of the image by the moving member, wherein the controller determines whether or not to interrupt the reading when the image forming section carries out the predetermined operation, based on a reading condition for when the moving member reads the image, wherein the controller restarts the reading after feeding the moving member in a reverse direction, wherein the reading condition is a reading resolution, wherein the image forming section includes an image bearing member for bearing a latent image, a plurality of developing devices for developing the latent image, and a rotation section that holds the plurality of developing devices and that rotates to move the developing devices and make a selected one of the developing devices oppose the image bearing member, and wherein the predetermined operation is a rotational operation of the rotation section.

With such an image forming apparatus, it is possible to substantially achieve all the effects stated above, and therefore the object of the invention is achieved more effectively.

It is also possible to achieve an image forming system including: a computer; and an image forming apparatus that is connectable to the computer and that includes an image forming section for forming an image, a document reading section capable of reading a document concurrently with an operation of the image forming section, the document reading section reading the document by successively shifting a reading position, and a controller that lowers a speed for shifting the reading position in the document reading section when the image forming section carries out a predetermined operation.

With such an image forming system, it is possible to mitigate the problem that reading of a document is not properly performed due to vibration, as well as prevent the time from when an operator instructs the apparatus to perform image formation to when the operator obtains a medium on which an image has been formed from being prolonged.

===Exemplary Configuration of Image Forming Apparatus===

An exemplary configuration of an image forming apparatus is described with reference to FIGS. 1 to 10. FIG. 1 is a perspective view showing an exemplary external configuration of an MFP apparatus 10. FIGS. 2 to 10 are described later.

The image forming apparatus of the present embodiment is a multi-function printer (hereinafter also referred to as "MFP apparatus 10") that has a document reading function for reading a document (namely, scanner function), an image forming function for forming an image on media such as paper, films or cloths (namely, printer function), a copy function for forming on a medium an image on a document read using the scanner function, or the like.

As shown in FIG. 1, in order to perform these functions, the MFP apparatus 10 includes a scanner unit 12 as an example of the document reading section for reading a document, and a printer unit 14 as an example of the image forming section for forming an image on a medium. The scanner unit 12 and the printer unit 14 are connected to each other via a signal line 16 that passes image signals and control signals.

It should be noted that when the scanner function of the MFP apparatus 10 is executed, an image on a document is read and the read image is stored in the MFP apparatus 10 as image data (signal) Moreover, the printer function of the MFP apparatus 10 includes a function to perform image formation based on the image data (signal) stored in the MFP apparatus 10 as a result of performing the scanner function (hereinafter, for convenience, this function is also referred to as "first printer function"), and a function to perform an image formation based on image data (signal) sent from a computer that is connected to the MFP apparatus 10 via a USB or a parallel interface, or a network (hereinafter, for convenience, this function is also referred to as "second printer function".)

<<<Exemplary Configuration of Scanner Unit 12>>>

Figure 2:
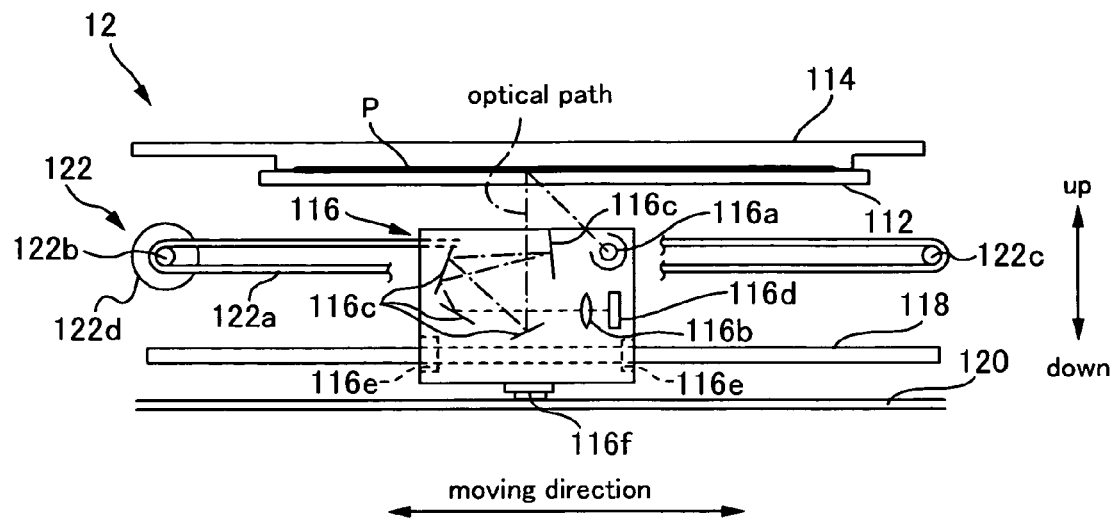
FIG. 2 is a diagram showing an exemplary internal configuration of a scanner unit 12.
Figure 3:
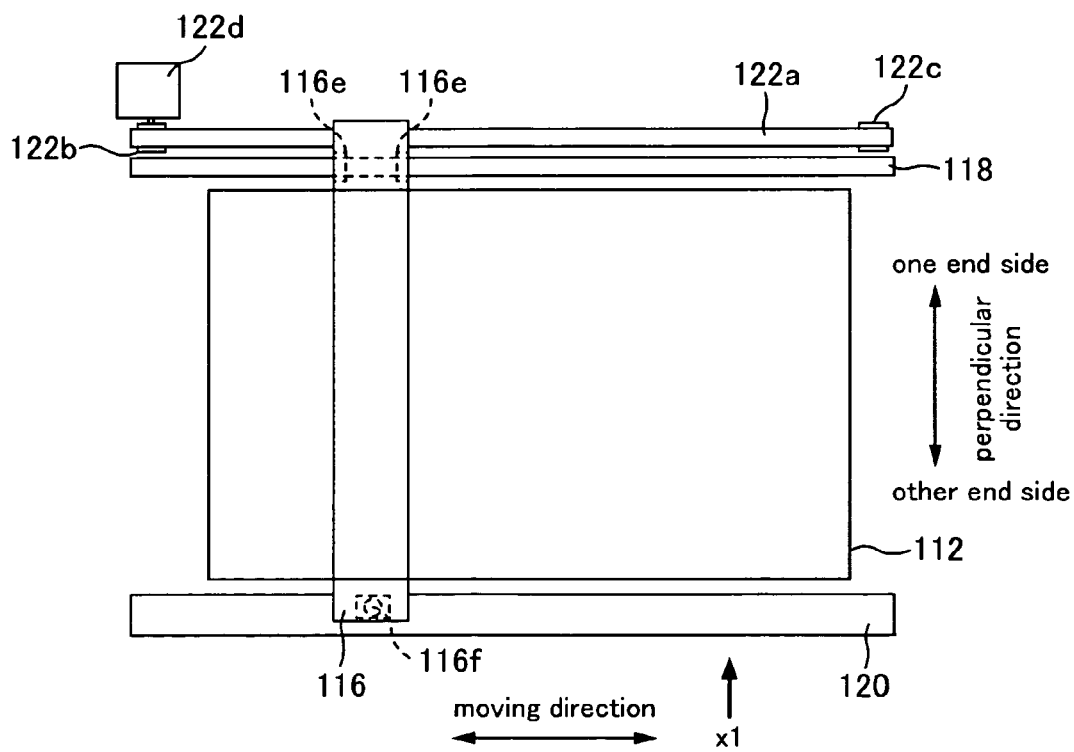
FIG. 3 is a diagram showing an exemplary internal configuration of the scanner unit 12.
Figure 4:
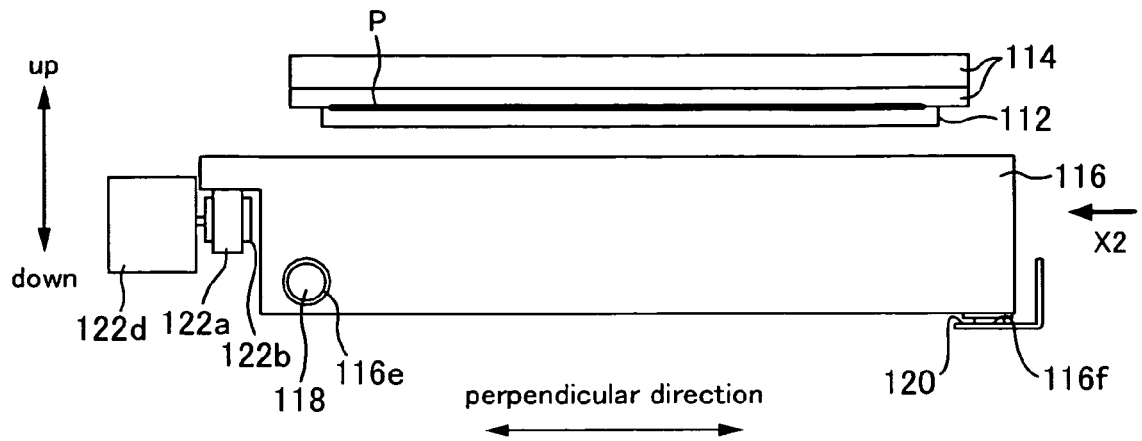
FIG. 4 is a diagram showing an exemplary internal configuration of the scanner unit 12.

An exemplary configuration of the scanner unit 12 is described below with reference to FIGS. 1 to 4. FIGS. 2 to 4 are diagrams showing an exemplary internal configuration of the scanner unit 12. FIG. 2 is a diagram schematically describing the scanner unit 12 shown in FIG. 3 from the direction of the arrow X1 in FIG. 3, and also is a diagram schematically describing the scanner unit 12 shown in FIG. 4 from the direction of the arrow X2 in FIG. 4.

The scanner unit 12 includes a document platen glass 112, a document platen cover 114, a reading carriage 116 as an example of a moving member, a guide member 118, a support rail 120, and a drive section 122.

The document platen glass 112 is a member on which a document P to be read is placed. The document platen glass 112 is provided in an upper portion of the scanner unit 12.

The document platen cover 114 has a function to cover the document platen glass 112 when reading a document or when the scanner unit 12 is not used. The document platen cover 114 is provided in a section above the document platen glass 112, and is configured so that it can be opened and closed. Furthermore, the document platen cover 114 has a function to press the document P placed on the document platen glass 112 against the document platen glass 112, when the document platen cover 114 is closed.

The reading carriage 116 has a function to read an image on the document P while moving. The reading carriage 116 is provided in a position in opposition to the document platen glass 112, and includes an exposure lamp 116a, a lens 116b, four mirrors 116c, a CCD sensor 116d, and so forth.

The exposure lamp 116a is a light source for emitting light to the document P through the document platen glass 112. The lens 116b is for focusing light reflected by the document P. The mirrors 116c are for guiding the reflected light to the lens 116b. When the light emitted to the document P by the exposure lamp 116a is reflected by the document P, the reflected light reaches the CCD sensor 116d through the four mirrors 116c and the lens 116b, and received by the CCD sensor 116d.

The CCD sensor 116d is made up of three line sensors in which photodiodes that convert light signals to electrical signals are arranged in a row. These three line sensors are arranged in parallel to one another. The CCD sensor 116d includes three filters (not shown) of R (red), G (green) and B (blue), and each line sensor is provided with a filter of a different color. Each line sensor detects light of a color component corresponding to the filter color of that line sensor. For example, the line sensor provided with the R filter detects the intensity of the red component light. The three line sensors are arranged in a direction that is substantially perpendicular to a moving direction of the reading carriage 116 (hereinafter also referred to as "perpendicular direction".)

The reading carriage 116 can move in the moving direction. In order to achieve the movability, the scanner unit 12 is provided with the guide member 118, the support rail 120, and the drive section 120.

The guide member 118 is a cylindrical member provided along the moving direction. The guide member 118 penetrates through a guide receiving section 116e made up of thrust bearings that are provided on one end side, in the perpendicular direction, of the reading carriage 116.

The support rail 120 is provided along the moving direction as well. The support rail 120 slidably supports a slide member 116f that is provided on the other end side, in the perpendicular direction, of the reading carriage 116.

The drive section 122 has a function to move the reading carriage 116 in the moving direction. The drive section 122 is provided on one end side in the perpendicular direction, and includes a timing belt 122a, a drive pulley 122b, a driven pulley 122c, a pulse motor 122d, and a home position sensor 122e (FIG. 11) for detecting a home position of the reading carriage 116.

The pulse motor 122d is a drive source and drives the drive pulley 122b that is attached to the rotary shaft of the pulse motor 122d. The drive pulley 122b that is driven rotates the timing belt 122a. The timing belt 122a is a circular belt and provided so that its longitudinal direction is along the moving direction. One end portion, in the longitudinal direction, of the reading carriage 116 is fixed to the timing belt 122a, and with the rotation of the timing belt 122a, the reading carriage 116 that is fixed to the timing belt 122a moves on the guide member 118 and the support rail 120. It should be noted that the drive pulley 122b is disposed on one end side, in the longitudinal direction, of the timing belt 122a, whereas on the other end side in the longitudinal direction of the timing belt 122a, the driven pulley 122c driven by the timing belt 122a is provided. In addition, the pulse motor 122d can rotate the timing belt 122a bi-directionally, and therefore the reading carriage 116 can move both in a forward direction (left-to-right direction of the moving directions indicated by the arrow in FIG. 2), and in a reverse direction (right-to-left direction of the moving directions indicated by the arrow in FIG. 2.)

The scanner unit 12 is provided with an operation panel 130. The operation panel 130 serves as an interface with an operator, and functions as an instruction receiving section for receiving various instructions from the operator and an information outputting section for providing various types of information to the operator. In order to perform these functions, the operation panel 130 includes an operation button, a liquid crystal panel and the like.

Processes corresponding to the respective buttons are carried out, for example, by pressing the scan button when the operator desires to read a document (an image on a document is read using the scanner function of the MFP apparatus 10, and the read image is stored in the MFP apparatus 10), by pressing the copy button when the operator desires to copy a document, and by pressing the print button when the operator desires to print an image (an image stored in the MFP apparatus 10 is formed on a medium using the printer function of the MFP apparatus 10).

The operation panel 130 of the present embodiment has a function for letting the operator select reading conditions for reading an image on the document. Examples of such reading conditions include, for example, the reading resolution and selection of whether an image is to be read according to the color mode or monochrome mode.

<<<Exemplary Configuration of Printer Unit 14>>>

Figure 5:
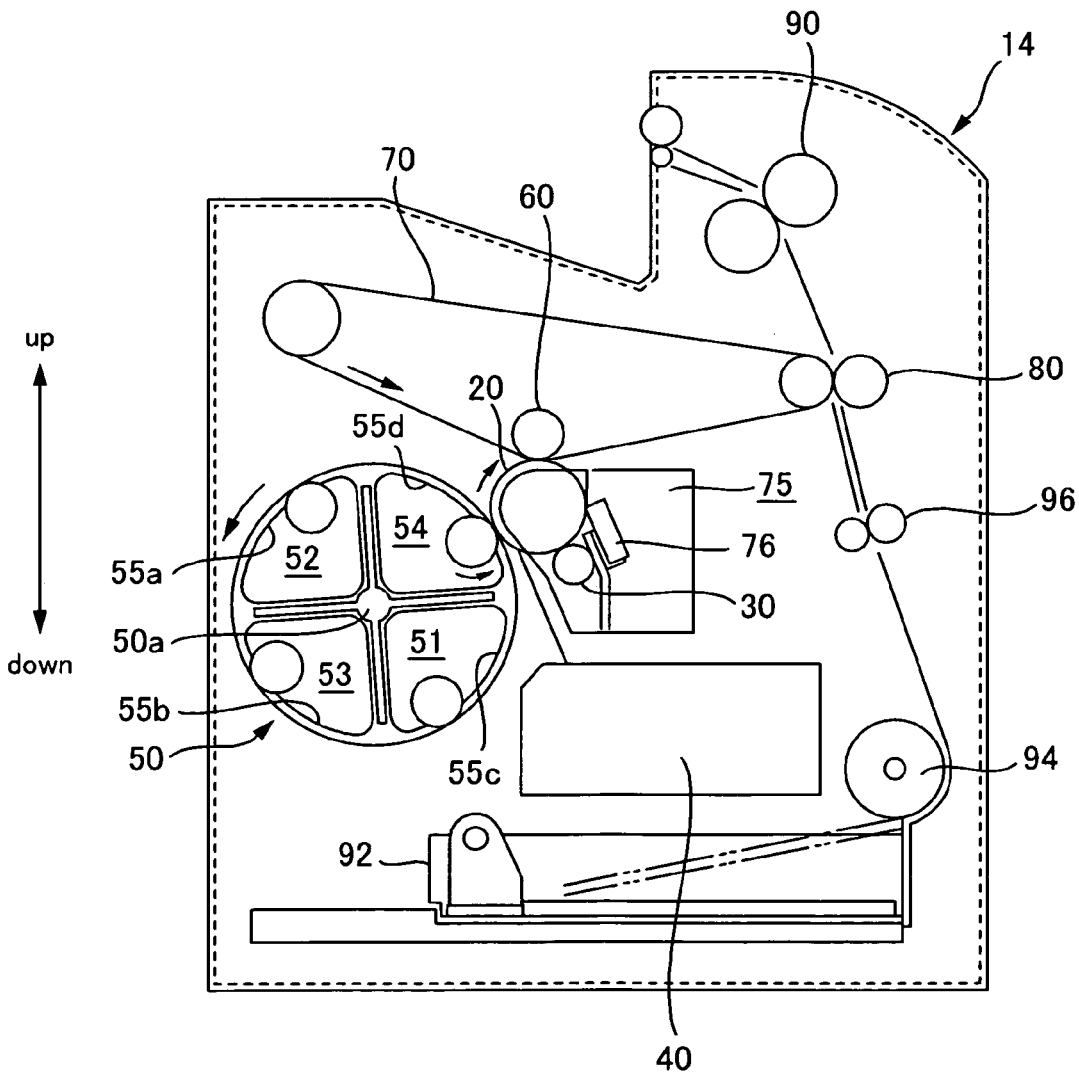
FIG. 5 is a diagram showing an exemplary internal configuration of a printer unit 14.

An exemplary configuration of the printer unit 14 is described with reference to FIG. 1, and FIGS. 5 to 10. FIG. 5 is a diagram showing an exemplary internal configuration of the printer unit 14. FIGS. 6 to 10 are described later. It should be noted that in FIG. 5, the vertical direction is shown by the arrows, and for example, a paper-feed tray 92 is disposed in a lower section of the printer unit 14, and a fixing unit 90 is disposed in an upper section of the printer unit 14.

The printer unit 14 of the present embodiment has, as shown in FIG. 5, a charging unit 30, an exposure unit 40, a YMCK developing unit 50 as an example of a rotation section, a first transferring unit 60, an intermediate transferring member 70, and a cleaning unit 75 that are arranged along the rotation direction of a photoconductor 20, and further includes a second transferring unit 80 and the fixing unit 90.

The photoconductor 20 has a cylindrical conductive base and a photoconductive layer formed on the outer peripheral surface of the conductive base, and is rotatable about its central shaft. In the present embodiment, the photoconductor 20 rotates clockwise, as shown by the arrow in FIG. 5.

The charging unit 30 is a device for charging the photoconductor 20. The exposure unit 40 is a device for forming a latent image on the charged photoconductor 20 by irradiating a laserbeam thereon. The exposure unit 40 has a semiconductor laser, a polygon mirror, an F-θ lens and the like, and irradiates a modulated laser beam onto the charged photoconductor 20 based on an image signal.

The YMCK developing unit 50 is a device for developing a latent image formed on the photoconductor 20 using a toner, which is an example of a developer contained in developing devices, that is, a black (K) toner contained in a black developing device 51, a magenta (M) toner contained in a magenta developing device 52, a cyan (C) toner contained in a cyan developing device 53, and a yellow (Y) toner contained in a yellow developing device 54.

The YMCK developing unit 50 rotates with the four developing devices 51, 52, 53 and 54 attached thereto, thereby moving the four developing devices 51, 52, 53 and 54. Specifically, the YMCK developing unit 50 holds the four developing devices 51, 52, 53 and 54 by four holding sections 55a, 55b, 55c and 55d. The four developing devices 51, 52, 53 and 54 can be rotated about the central shaft 50a, while maintaining their respective positions. Every time image formation corresponding to one page is completed, the four developing devices 51, 52, 53 and 54 are alternatively opposed to the photoconductor 20, and successively develop the latent image formed on the photoconductor 20, using the toners contained in the developing devices 51, 52, 53 and 54. It should be noted that each of the four developing devices 51, 52, 53 and 54 can be attached to and removed from the main unit of the image forming apparatus, more specifically, the holding sections 55a, 55b, 55c and 55d of the YMCK developing unit 50. The YMCK developing unit 50 is described later in detail.

The first transferring unit 60 is a device for transferring, onto the intermediate transferring member 70, a single-color toner image formed on the photoconductor 20. When toner images of four colors are successively transferred in a superposed manner, a full-color toner image is formed on the intermediate transferring member 70.

The intermediate transferring member 70 is an endless belt that is made by providing a tin-deposited layer on the surface of a PET film, and forming and laminating on the surface thereof a semiconductor coating. The intermediate transferring member 70 is driven to rotate at substantially the same circumferential speed as the photoconductor 20.

In the vicinity of the intermediate transferring member 70, a synchronization reading sensor RS is disposed. The synchronization reading sensor RS is a sensor for detecting a reference position of the intermediate transferring member 70, and functions as a vertical synchronization reading sensor for obtaining a synchronization signal, i.e., a vertical synchronization signal Vsync, in a sub-scanning direction that is substantially perpendicular to the main scanning direction. More specifically, the synchronization reading sensor RS has a light emitting section for emitting light and a light receiving section for receiving light, and when light emitted by the light emitting section passes through a hole formed in a predetermined position in the intermediate transferring member 70, the light receiving section receives that light, and the synchronization reading sensor RS outputs a pulse signal each time the intermediate transferring member 70 makes one rotation.

The second transferring unit 80 is a device for transferring a single-color toner image or a full-color toner image formed on the intermediate transferring member 70 onto a medium such as paper, film, and cloth.

The fixing unit 90 is a device for fusing the single-color toner image or the full-color toner image, which has been transferred to the medium, onto the medium to turn it into a permanent image.

The cleaning unit 75 is a device that is provided between the first transferring unit 60 and the charging unit 30, has a rubber cleaning blade 76 abutted against the surface of the photoconductor 20, and is for removing the toner remaining on the photoconductor 20 by scraping it off with the cleaning blade 76 after the toner image has been transferred onto the intermediate transferring member 70 by the first transferring unit 60.

<Exemplary Configuration of YMCK Developing Unit>

An exemplary configuration of the YMCK developing unit 50 is described more specifically with reference to FIGS. 6 to 10. The YMCK developing unit 50 has a central shaft 50a that is located at the center of the YMCK developing unit 50. A support frame 55 for holding the developing devices is fixed to the central shaft 50a. The central shaft 50a is extended between two frame side plates (not shown) that form a part of the housing of the printer unit 14, and is supported at both end portions thereof. The axial direction of the central shaft 50a intersects the vertical direction.

The support frame 55 is provided with the four holding sections 55a, 55b, 55c and 55d that respectively hold the above-mentioned four developing devices 51, 52, 53 and 54 in a detachable manner. The holding sections are arranged at an interval of 90° in the circumferential direction.

A pulse motor that is not shown is connected to the central shaft 50a via a clutch. The pulse motor is driven to rotate the support frame 55, thereby positioning the four developing devices 51, 52, 53 and 54 in a predetermined position.

Figure 6:
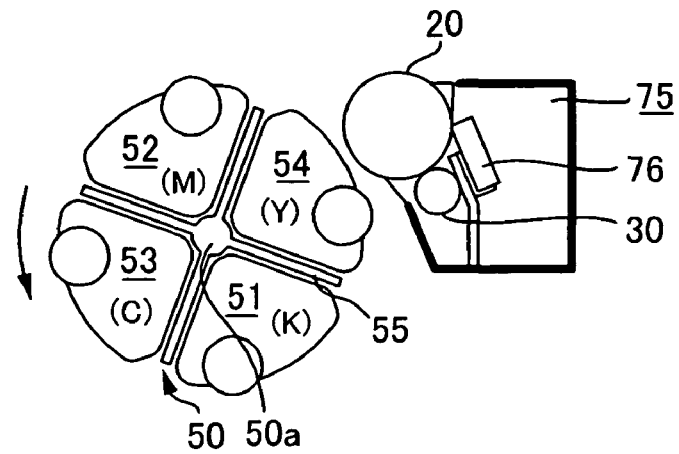
FIG. 6 is a diagram showing a HP position.
Figure 7:
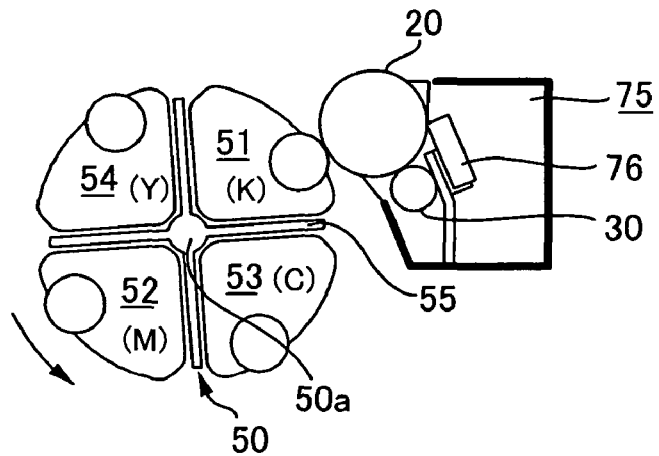
FIG. 7 is a diagram showing a developing position of a black developing device 51.
Figure 8:
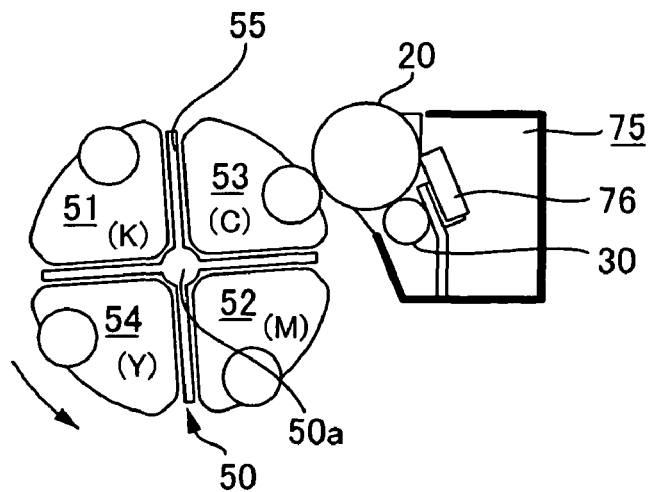
FIG. 8 is a diagram showing the developing position of a cyan developing device 53.
Figure 9:
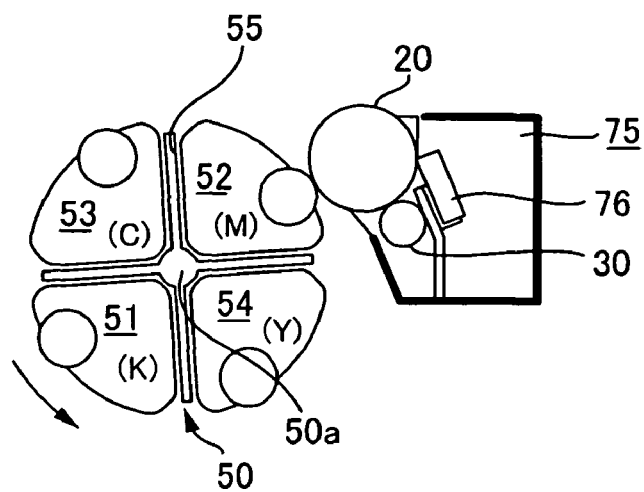
FIG. 9 is a diagram showing the developing position of a magenta developing device 52.
Figure 10:
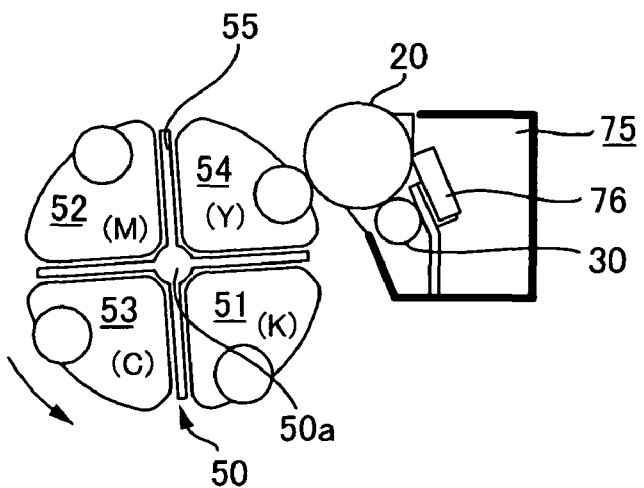
FIG. 10 is a diagram showing the developing position of a yellow developing device 54.

FIGS. 6 to 10 are diagrams respectively showing five stop positions of the YMCK developing unit 50 that rotates. FIG. 6 shows a home position (hereinafter referred to as "HP position") that is a standby position when standing by for execution of image formation and also a stop position serving as a reference position in the rotation direction of the YMCK developing unit 50. FIG. 7 shows a developing position of the black developing device 51 attached to the YMCK developing unit 50. FIG. 8 shows the developing position of the cyan developing device 53 attached to the YMCK developing unit 50. FIG. 9 shows the developing position of the magenta developing device 52 attached to the YMCK developing unit 50. FIG. 10 shows the developing position of the yellow developing device 54 attached to the YMCK developing unit 50.

First of all, the HP position shown in FIG. 6 is described. On one end side of the central shaft 50a of the YMCK developing unit 50, an HP detecting section (not shown) for detecting the HP position is provided. The HP detecting section is made of a disk that is for generating signals and that is fixed to one end of the central shaft 50a, and an HP sensor made of, for example, a photo interrupter provided with a light emitting section and a light receiving section. The circumferential section of the disk is disposed so as to be located between the light emitting section and the light receiving section of the HP sensor. When a slit section formed in the disk moves to a detection position of the HP sensor, the output signal from the HP sensor changes from "L" to "H". Then, the HP position of the YMCK developing unit 50 is detected based on the change in the signal level and the number of pulses of the pulse motor, and using the HP position as a reference, each developing device can be positioned at the developing position.

FIG. 7 shows the developing position of the black developing device 51 achieved by rotating the pulse motor for a predetermined number of pulses from the HP position. When the YMCK developing unit 50 is positioned at the developing position of the black developing device 51, the black developing device 51 that opposes the photoconductor 20 develops a latent image formed on the photoconductor 20. When the pulse motor rotates the YMCK developing unit 50 counter-clockwise by 90°, as shown in FIG. 8, the YMCK developing unit 50 is positioned at the developing position of the cyan developing device 53. When the YMCK developing unit 50 is further rotated counter-clockwise by 90°, as shown in FIG. 9, the YMCK developing unit 50 is positioned at the developing position of the magenta developing device 52. When the YMCK developing unit 50 is further rotated counter-clockwise by 90°, as shown in FIG. 10, the YMCK developing unit 50 is positioned at the developing position of the yellow developing device 54.

It should be noted that a locking mechanism (not shown) is provided in the YMCK developing unit 50 for ensuring fixing the YMCK developing unit 50 at the above-described positions.

===Exemplary Configuration of Controller of Image Forming Apparatus===

Figure 11:
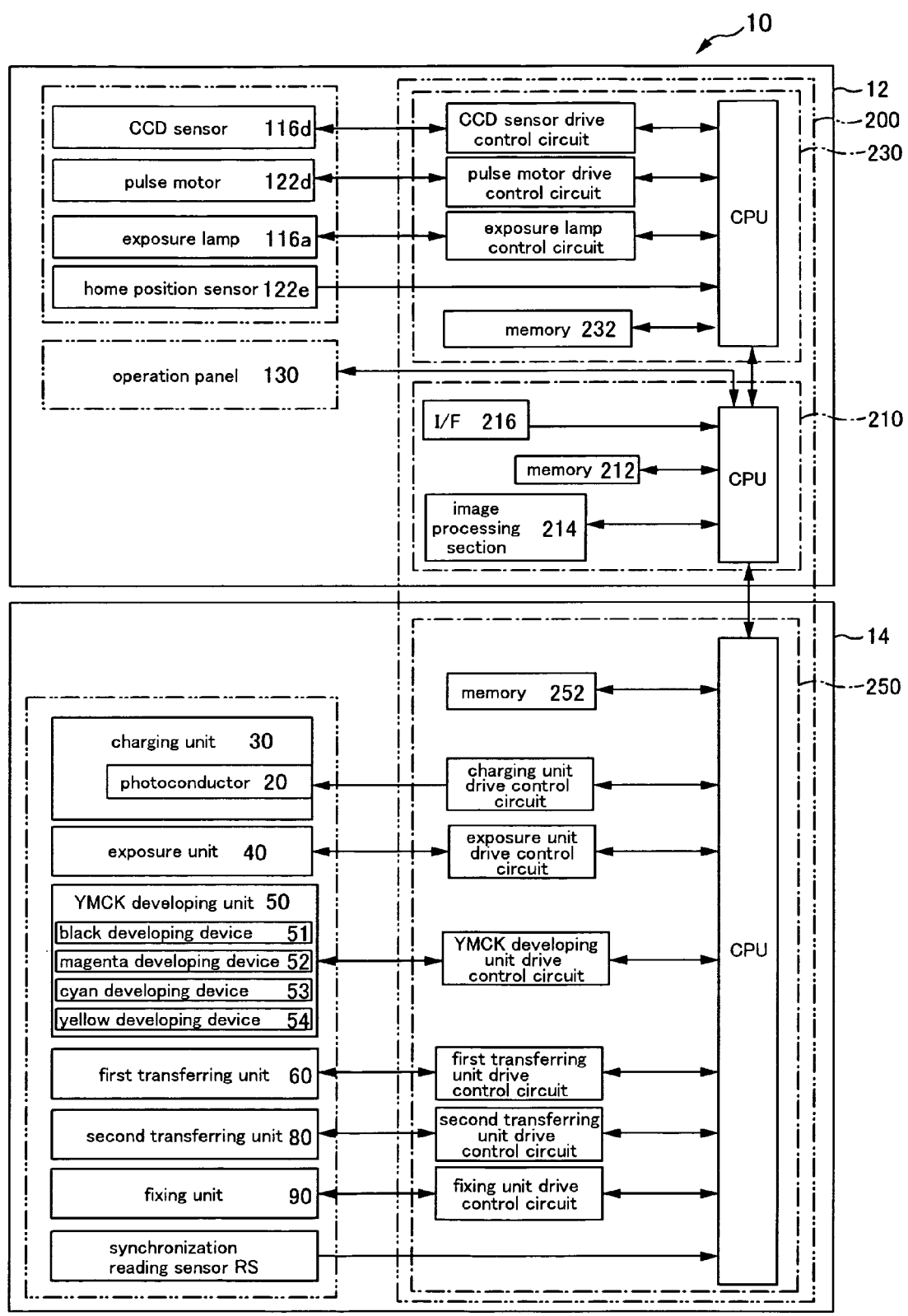
FIG. 11 is a block diagram showing the configuration of a controller 200.

An exemplary configuration of the controller 200 of the MFP apparatus 10 is described with reference to FIG. 11. FIG. 11 is a block diagram showing the configuration of the controller 200.

The controller 200 includes a main controller 210, a scanner controller 230, and a printer controller 250.

The main controller 210 is a controller to control the scanner controller 230 and the printer controller 250, and includes, for example, an interface section 216 and an image processing section 214. The interface section 216 serves as an interface with a computer connected to the MFP apparatus 10 via a USB or a parallel interface or a network. The image processing section 214 is for carrying out a process to convert color components of image data from RGB to YMCK, a halftone process or the like.

The scanner controller 230 is electrically connected to each unit in the scanner unit 12 (exposure lamp 116a, CCD sensor 116d, pulse motor 122d, and the like), and includes drive control circuits to control these. The scanner controller 230 controls the units based on signals inputted from the main controller 210.

In the same manner, the printer controller 250 is electrically connected to each unit in the printer unit 14 (charging unit 30, exposure unit 40, YMCK developing unit 50, first transferring unit 60, second transferring unit 80, fixing unit 90, and the like), and includes drive control circuits to control these. The printer controller 250 controls the units based on signals inputted from the main controller 210.

The main controller 210, the scanner controller 230, and the printer controller 250 have a CPU and memories 212, 232 and 252, respectively. Each memory stores a program, and the CPU processes the program to carry out various operations. In addition, the memories store image data, control data and the like.

===Exemplary Operation of Image Forming Apparatus===

An exemplary operation of the MFP apparatus 10 is described. As described above, the MFP apparatus 10 of the present embodiment has the scanner function, the printer function (the first printer function and the second printer function) and the copy function. The operation of the MFP apparatus 10 is described below for each function. It should be noted that each operation of the MFP apparatus described below is carried out mainly by the controller 200 in the MFP apparatus 10, and particularly in this embodiment, by the CPU processing the program stored in the memory. The program is composed of codes for carrying out various operations described below.

<<<Operation when Scanner Function is Carried Out>>>

Initially, the operation of the MFP apparatus 10 when the scanner function is performed with the MFP apparatus 10 is described.

When an operator instructs the apparatus to perform the scanner function using the operation panel 130 (in this embodiment, by pressing down the scanner button), the operation panel 130 sends out a signal indicating execution of the scanner function to the main controller 210. The main controller 210 that has received the signal provides an instruction to start reading a document to the scanner controller 230. The scanner controller 230 that has received the instruction controls the exposure lamp 116a, the CCD sensor 116d, the pulse motor 122d and the like in the scanner unit 12 by the control circuits corresponding to these, thereby causing the scanner unit 12 to carry out the document reading operation described below.

When the document reading operation starts, initially, the exposure lamp 116a emits light onto the document P placed on the document platen glass 112. Then, with the light being emitted onto the document P, the pulse motor 122d moves the reading carriage 116 in the forward direction.

The reading carriage 116, while moving in the forward direction, receives, using the CCD sensor 116d, the light emitted by the exposure lamp 116a and reflected by the document P. At this time, the CCD sensor 116d reads the amount of the reflected light that is received at a predetermined cycle, and successively converts the read light amount to voltage values.

That is, the CCD sensor 116d reads the document P (an image on the document P) as RGB image data expressed in the RGB color space by successively shifting the reading position. The read RGB image data is, eventually, stored in the memory 212 in the main controller 210.

<<<Operation when First Printer Function is Carried Out>>>

Next, the operation of the MFP apparatus 10 when the first printer function is performed with the MFP apparatus 10 is described.

When an operator selects an image to be printed by operating the operation panel 130 and instructs the apparatus to perform the first printer function using the operation panel 130 (in this embodiment, by pressing down the print button), the operation panel 130 sends out a signal indicating execution of the first printer function to the main controller 210. The main controller 210 that has received the signal carries out an image processing (color component conversion process, halftone process, etc.) of RGB image data that is stored in the memory 212 and corresponds to the image selected by the operator, and converts the RGB image data into image data for image formation (the image data after being subjected to the image processing is also referred to as "YMCK image data".) (The converted YMCK image data is also stored in the memory 212.) Then, the main controller 210 provides an instruction to start forming an image to the printer controller 250. The printer controller 250 that has received the instruction controls the units in the printer unit 14 by the control circuits corresponding to these, thereby causing the printer unit 14 to carry out the image forming operation described below.

When the image forming operation starts, initially, the photoconductor 20 and the intermediate transferring member 70 rotate as controlled by the printer controller 250. Thereafter, the reference position of the intermediate transferring member 70 is detected by the synchronization reading sensor RS, and a pulse signal is outputted. The pulse signal is sent to the printer controller 250, and various operations described below are carried out as controlled by the printer controller 250, in accordance with the pulse signal.

While rotating, the photoconductor 20 is successively charged by the charging unit 30 at a charging position. The charged area on the photoconductor 20 reaches the exposing position with the rotation of the photoconductor 20, and by the exposure unit 40, a latent image corresponding to image information of the first color (in this embodiment, black K) is formed on the area based on the aforementioned YMCK image data.

The YMCK developing unit 50 rotates from the HP position (FIG. 6) and stops at the developing position of the black developing device 51 (FIG. 7) at which the black developing device 51 opposes the photoconductor 20. The latent image formed on the photoconductor 20 reaches the developing position with the rotation of the photoconductor 20, and is developed with a black toner by the black developing device 51. As a result, a black toner image is formed on the photoconductor 20.

With the rotation of the photoconductor 20, the black toner image formed on the photoconductor 20 reaches a first transferring position and is transferred onto the intermediate transferring member 70 by the first transferring unit 60. At this time, a first transfer voltage with a polarity that is opposite to the polarity for charging the toner is applied to the first transferring unit 60. It should be noted that, during this period, the photoconductor 20 and the intermediate transferring member 70 are in contact, whereas the second transferring unit 80 is separated from the intermediate transferring member 70.

With the above-described process being carried out successively for the second color (in this embodiment, cyan C), the third color (in this embodiment, magenta M) and the fourth color (in this embodiment, yellow Y) with the respective developing devices, toner images in four colors corresponding to YMCK image data are transferred to the intermediate transferring member 70 in a superimposed manner. Thus, a full-color toner image is formed on the intermediate transferring member 70. When the process for the first color transits to the process for the second color, the YMCK developing unit 50 rotates from the developing position of the black developing device 51 (FIG. 7) to the developing position of the cyan developing device 53 (FIG. 8). Similarly, when the process for the second color transits to the process for the third color, the YMCK developing unit 50 rotates from the developing position of the cyan developing device 53 (FIG. 8) to the developing position of the magenta developing device 52 (FIG. 9). When the process for the third color transits to the process for the fourth color, the YMCK developing unit 50 rotates from the developing position of the magenta developing device 52 (FIG. 9) to the developing position of the yellow developing device 54 (FIG. 10). When development for the fourth color is completed, the YMCK developing unit 50 rotates from the developing position of the yellow developing device 54 (FIG. 10), and returns to the HP position (FIG. 6).

With the rotation of the intermediate transferring member 70, the full-color toner image formed on the intermediate transferring member 70 reaches a second transferring position, and is transferred onto a medium by the second transferring unit 80. It should be noted that the medium is carried from the paper-feed tray 92 to the second transferring unit 80 via the paper-feed roller 94 and the register rollers 96. When the transferring operation is carried out, the second transferring unit 80 moves so as to be abutted against the intermediate transferring member 70 via the medium, and a second transfer voltage is applied to the second transferring unit 80.

The full-color toner image transferred onto the medium is heated and pressurized by the fixing unit 90 and fused to the medium.

Meanwhile, after the photoconductor 20 passes by the first transferring position, the toner adhering to the surface of the photoconductor 20 is scraped off by the cleaning blade 76 that is supported by the cleaning unit 75, and the photoconductor 20 is prepared for charging for the next latent image to be formed. The scraped-off toner is collected into a remaining-toner collector of the cleaning unit 75.

<<<Operation when Second Printer Function is Carried Out>>>

Next, the operation of the MFP apparatus 10 when the second printer function is performed with the MFP apparatus 10 is described.

When image data (signal) and control data (signal) are inputted to the main controller 210 of the MFP apparatus 10 via the interface section 216 from a computer that is connected to the MFP apparatus 10 via a USB or a parallel interface, or a network, the main controller 210 provides to the printer controller 250 an instruction to start forming an image, based on a signal contained in the control data (signal) indicating execution of the second printer function. The printer controller 250 that has received the instruction controls the units in the printer unit 14 by the control circuits corresponding to these and causes the printer unit 14 to carry out the above-described image forming operation. It should be noted that the image data sent from the computer is, usually, YMCK image data that has already been subjected to image processing (this image processing is carried out by the printer driver in the computer), and at this time, unlike the case of performing the first printer function, no image processing is carried out by the image processing section 214.

<<<Operation when Copy Function is Carried Out>>>

Next, the operation of the MFP apparatus 10 when the copy function is performed with the MFP apparatus 10 is described.

When an operator instructs the apparatus to perform the copy function using the operation panel 130 (in this embodiment, by pressing down the copy button), the operation panel 130 sends out a signal indicating execution of the copy function to the main controller 210. Then, the main controller 210 that has received the signal provides an instruction to start reading a document to the scanner controller 230. The scanner controller 230 that has received the instruction controls the exposure lamp 116a, the CCD sensor 116d, the pulse motor 122d, and the like in the scanner unit 12 by the control circuits corresponding to these, thereby causing the scanner unit 12 to carry out the above-described document reading operation.

The main controller 210 carries out, using the image processing section 214, image processing (color conversion process, halftone process, etc.) on RGB image data that is read by the scanner unit 12 and stored in the memory 212 in the main controller 210 so as to convert the RGB image data into YMCK image data. The main controller 210 then provides an instruction to start forming an image to the printer controller 250. The printer controller 250 that has received the instruction controls the units in the printer unit 14 by the control circuits corresponding to these and causes the printer unit 14 to carry out the above-described image forming operation.

===Control of Scanner Unit by Controller when Document Reading Operation and Image Forming Operation are Concurrently Carried Out===

As described above, the image forming apparatus of the present embodiment has a plurality of functions, and therefore a case is possible in which the scanner unit 12 carries out an operation to read a document concurrently with an operation of the printer unit 14. Examples of such a case include, for example, when the scanner function and the printer function are concurrently performed, or when the copy function and the scanner function are concurrently performed.

Furthermore, as explained in the section of Related Art, the printer unit 14 may vibrate when it operates. An example of such operations of the printer unit 14 is, for example, the above-described rotational operation of the YMCK developing unit 50. When the scanner unit 12 carries out an operation to read a document concurrently with the rotational operation, the vibration may be transferred to the scanner unit 12, and thus reading of a document may not be properly performed.

In order to address this problem, in the MFP apparatus 10 of the present embodiment, when the printer unit 14 carries out a predetermined operation (in this embodiment, the rotational operation of the YMCK developing unit 50), the controller 200 performs a control to lower the speed for shifting the reading position in the scanner unit 12 (in other words, lower the moving speed of the reading carriage 116 that reads an image.)

Figure 12:
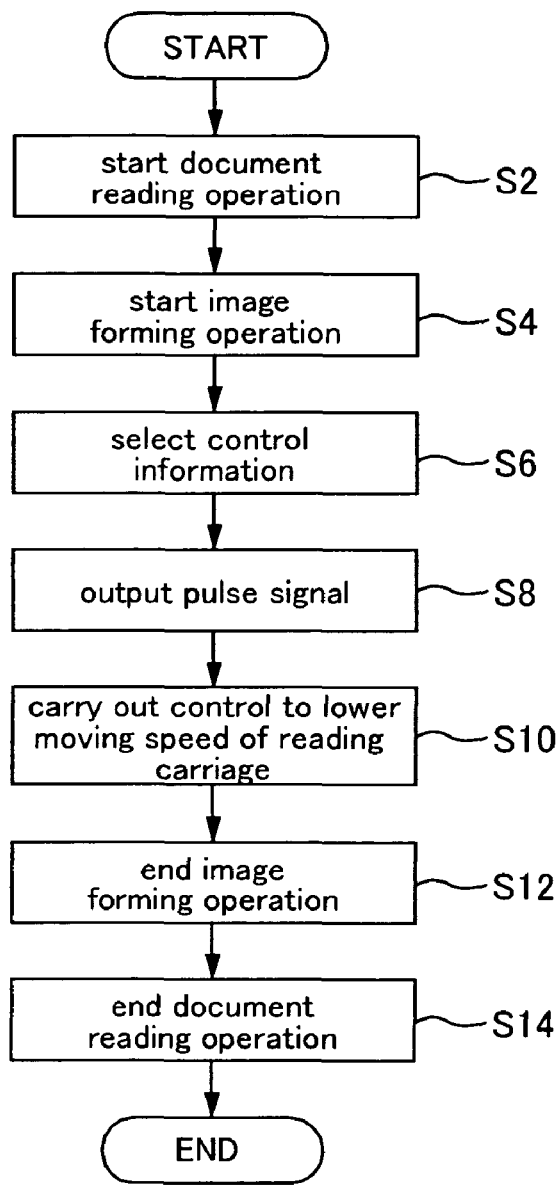
FIG. 12 is a flow chart showing an operation of the MFP apparatus 10 when a document reading operation and an image forming operation are concurrently carried out.
Figure 13:
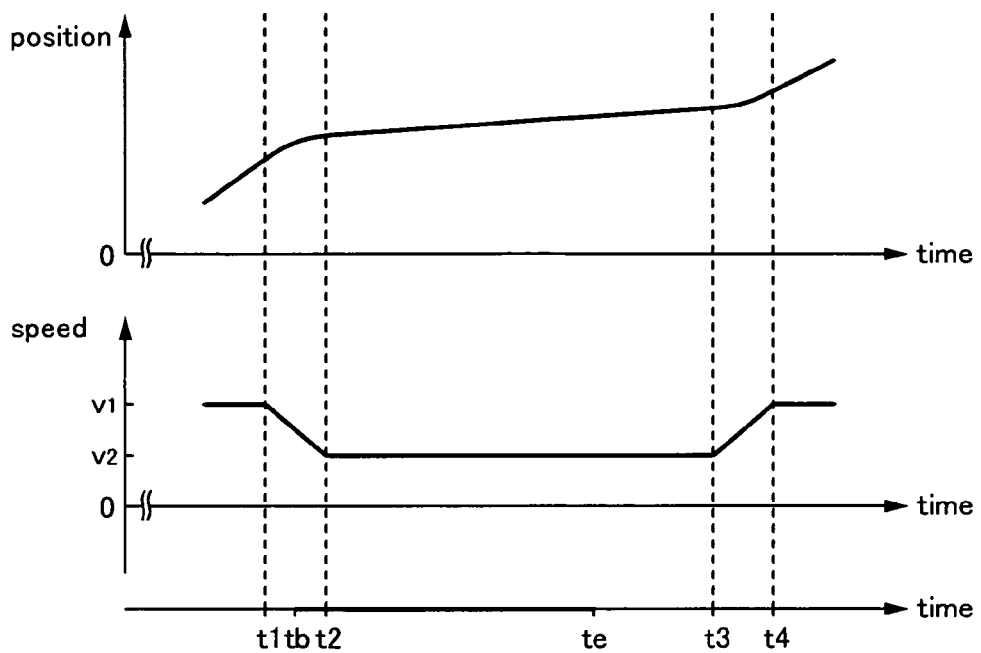
FIG. 13 is a diagram showing a control to lower the moving speed of a reading carriage 116.
Figure 14:
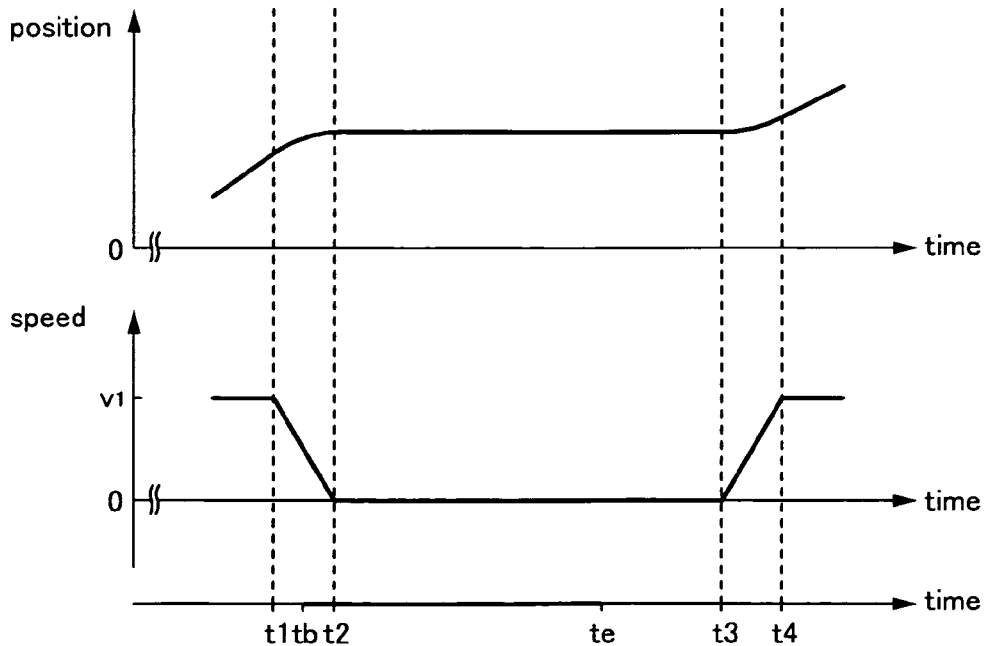
FIG. 14 is a diagram showing another example of the control to lower the moving speed of the reading carriage 116.
Figure 15:
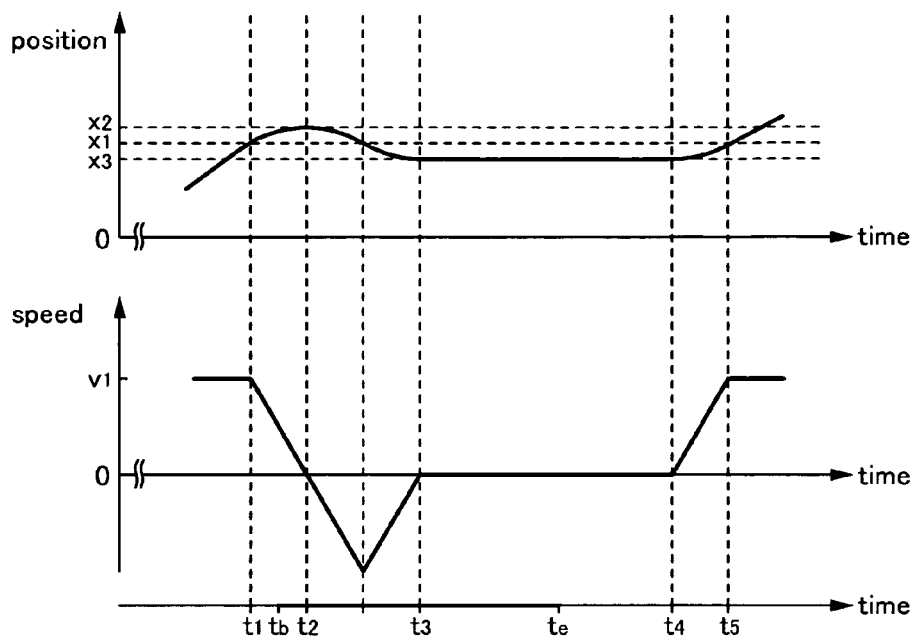
FIG. 15 is a diagram showing yet another example of the control to lower the moving speed of the reading carriage 116.
Figure 16:
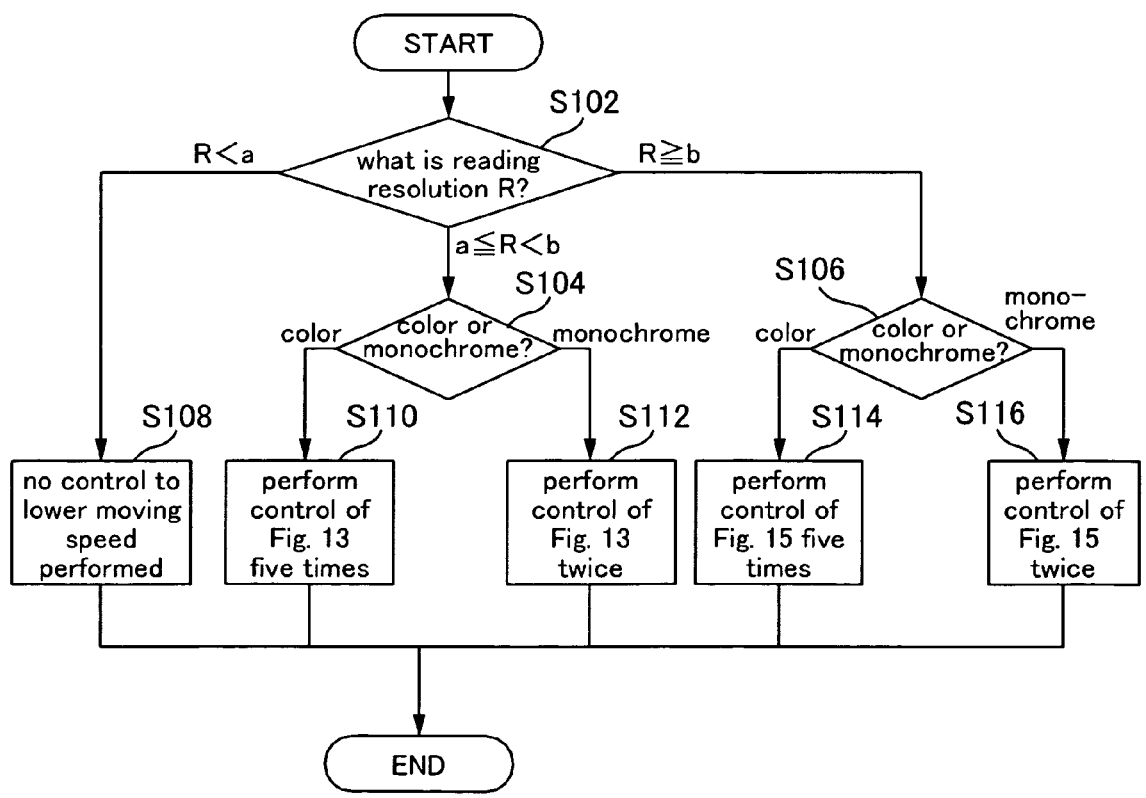
FIG. 16 is a flow chart showing a method for determining the control to lower the moving speed of the reading carriage 116.

Hereinafter, the control is described specifically with reference to FIGS. 12 to 16. FIG. 12 is a flow chart showing the operation of the MFP apparatus 10 when a document reading operation and an image forming operation are concurrently carried out. FIG. 13 is a diagram showing the control to lower the moving speed of the reading carriage 116. FIGS. 14 and 15 are diagrams showing other examples of the control. FIG. 16 is described later. In this example, a case is described in which the scanner function and the second printer function are concurrently carried out, wherein the printer unit 14 starts an image forming operation immediately after the scanner unit 12 starts a document reading operation and the image forming operation is finished immediately before the document reading operation is finished.

When an operator instructs the apparatus to perform the scanner function using the operational panel 130 (in this embodiment, by pressing down the scan button), the scanner unit 12 starts the document reading operation (step S2). The reading carriage 116 provided in the scanner unit 12 receives the reflected light with the CCD sensor 116d while moving in the forward direction, and the CCD sensor 116d reads at a predetermined cycle the amount of the reflected light that is received, and successively converts the read light amount to voltage values.

Then, with image data (signal) and control data (signal) being inputted from a computer to the main controller 210 of the MFP apparatus 10, the main controller 210 provides an instruction to start forming an image to the printer controller 250, based on a signal contained in the control data (signal) indicating execution of the second printer function. The printer controller 250 that has received the instruction controls the units in the printer unit 14 and causes the printer unit 14 to carry out the image forming operation. As a result, the image forming operation by the printer unit 14 is started (step S4).

Also as described above, when the printer unit 14 carries out the rotational operation of the YMCK developing unit 50, the controller 200 performs the control to lower the moving speed of the reading carriage 116. At this time, the main controller 210 determines the control (more specifically, the timing to start lowering the moving speed, the timing to cause the moving speed to start returning to the original speed, or the like) depending on whether the image formation is to be performed in color mode or monochrome mode (step S6). Information relating to the control (hereinafter, also simply referred to as "control information") for each of color mode and monochrome mode is stored in the memory 212 of the main controller 210. The main controller 210 refers to the information concerning whether the image formation is to be performed in color mode or monochrome mode that is contained in the control data (signal) sent from the computer, and based on the information, selects one of the two types of control information.

The control information is described here more specifically. As described above, the printer controller 250 controls execution of various image forming operations in accordance with a pulse signal outputted by the synchronization reading sensor RS. The timing to carry out the various image forming operations (in other words, the period of time from when the printer controller 250 receives the pulse signal until it carries out the various image forming operations) is determined in advance. The timing to carry out the various image forming operations differs between when the image formation is to be performed in color mode and when the image formation is to be performed in monochrome mode.

For example, when the image formation is performed in color mode, the rotational operation of the YMCK developing unit 50 is carried out five times from the beginning to the end of the image formation (that is, the rotational operation from the HP position to the developing position of the black developing device 51, that from the developing position of the black developing device 51 to the developing position of the cyan developing device 53, that from the developing position of the cyan developing device 53 to the developing position of the magenta developing device 52, that from the developing position of the magenta developing device 52 to the developing position of the yellow developing device 54, and that from the developing position of the yellow developing device 54 to the HP position), and the beginning timing and the end timing with reference to the pulse signal of these rotational operations are determined in advance. When the image formation is performed in monochrome mode, the rotational operation of the YMCK developing unit 50 is carried out twice (that is, the rotational operation from the HP position to the developing position of the black developing device 51 and that from the developing position of the black developing device 51 to the HP position), and the beginning timing and the end timing with reference to the pulse signal of these rotational operations are determined in advance.

In the present embodiment, the scanner controller 230 controls movement of the reading carriage 116 so that the moving speed of the reading carriage 116 during the period in which the rotational operation of the YMCK developing unit 50 is carried out (five periods for color mode, and two periods for monochrome mode) is slower than the normal speed (hereinafter, this speed is referred to as "v1") (this control is described in detail later.) For example, the timing to start lowering the moving speed with reference to the pulse signal, and the timing to cause the moving speed to start returning to the original speed with reference to the pulse signal are calculated in advance based on the beginning timing and the end timing of the rotation operation that are already known. The calculated timings and the like are written in the control information stored in the memory 212 of the main controller 210.

The description of the control is continued again with reference to the flow chart shown in FIG. 12. When the main controller 210 selects one of the two types of control information based on the information on whether the image formation is performed in color mode or monochrome mode (in this case, it is assumed that the control information for color mode is selected) (step S6), after a while, a pulse signal is outputted (step S8), which is sent to the printer controller 250. Then, the printer controller 250 notifies the main controller 210 of a receive time (that time is referred to as "t0") at which the printer controller 250 received the pulse signal. The main controller 210 sends out to the scanner controller 230 the selected control information as well as notifying the scanner controller 230 of the receive time t0. The scanner controller 230 then performs the control to lower the moving speed of the reading carriage 116 when the printer unit 14 carries out the rotational operation of the YMCK developing unit 50 based on the receive time t0 and the control information (step S10). More specifically, the scanner controller 230 controls movement of the reading carriage 116 so that the moving speed of the reading carriage 116 during the five periods in which the rotational operation of the YMCK developing unit 50 is carried out is slower than the normal speed v1, based on the receive time t0 and the control information.

This embodiment will be described more specifically with reference to FIG. 13. Three diagrams are shown in FIG. 13, and in each of the diagrams, the horizontal axis indicates time (more specifically, the time that has lapsed from the receive time t0.) In the bottom diagram, the bold line indicates the period during which the first rotational operation of the above-described five rotational operations is carried out. The vertical axis of the middle diagram shows the moving speed of the reading carriage 116 and the vertical axis in the top diagram shows the position of the reading carriage 116.

As shown in FIG. 13, the scanner controller 230 starts lowering the moving speed of the reading carriage 116 immediately before the rotational operation begins (time t1). Then, when the moving speed is reduced to v2 (time t2) after the rotational operation begins (time tb), the moving speed is made constant. Then, after the rotational operation ends (time te), at time t3, the scanner controller 230 causes the moving speed of the reading carriage 116 to start returning to the original speed (starts increasing the moving speed). At time t4, the moving speed of the reading carriage 116 returns to the original moving speed v1. It should be noted that while the CCD sensor 116d continues to read the amount of the reflected light during this period (from time t1 to t4), the scanner controller 230 changes the reading cycle of the light amount according to the change in the moving speed of the reading carriage 116 (in proportion to the moving speed.) (Specifically, the slower the moving speed is, the longer the reading cycle becomes.)

The scanner controller 230 performs a similar control during the periods in which the second to the fifth rotational operations are carried out. After that, the image formation operation by the printer unit 14 is finished (step S12), and subsequently the document reading operation by the scanner unit 12 is ended (step S14).

As described above, in the MFP apparatus 10 of the present embodiment, when the printer unit 14 carries out the rotational operation of the YMCK developing unit 50, the controller 200 carries out the control to lower the speed for shifting the reading position in the scanner unit 12, in other words, to lower the moving speed of the reading carriage 116 that reads an image. More specifically, the scanner controller 230 controls movement of the reading carriage 116 so that the moving speed of the reading carriage 116 during the period in which the rotational operation of the YMCK developing unit 50 is carried out is slower than the normal speed v1.

Due to this control, the amount of data, among RGB image data obtained by reading an image, that is obtained when the rotational operation of the YMCK developing unit 50 is carried out is reduced. For this reason, the amount of image data that is affected by the vibration generated due to the rotational operation is reduced, and thus the problem that reading of a document is not properly performed due to the vibration is mitigated.

With the MFP apparatus of the present embodiment, since the image forming operation by the printer unit 14 starts before reading of a document is finished, it is possible to prevent the time from when an operator instructs the apparatus to perform image formation to when the operator obtains a medium on which the image has been formed from being prolonged.

In the above description, it was described that during the period from time t1 to time t4, the scanner controller 230 changes the reading cycle of the amount of the reflected light according to the change in the moving speed of the reading carriage 116, but there is no limitation to this. It is also possible to thin out the RGB image data that is obtained during that period without changing the reading cycle of the reflected light (in other words, to discard part of the data.)

Also in the above description, considering that the vibration continues for a while after the rotation of the YMCK developing unit 50 ends (time te), the operation to cause the moving speed of the reading carriage 116 to return to the original speed is started after a certain period of time lapses after the rotation ends, i.e., at time t3.

<<<Regarding Another Example of Control to Lower Moving Speed of Reading Carriage>>>

Here, two other examples of the control to lower the moving speed of the reading carriage 116 are described with reference to FIGS. 14 and 15. In FIGS. 14 and 15, as in FIG. 13, three diagrams are shown, and in each of the diagrams the horizontal axis indicates time (more specifically, the time that has lapsed from the receive time t0.) In the bottom diagram, the bold line indicates the period during which the first rotational operation of the above-described five rotational operations is carried out. The vertical axis of the middle diagram shows the moving speed of the reading carriage 116 and the vertical axis in the top diagram shows the position of the reading carriage 116.

First, the control example shown in FIG. 14 is described. The scanner controller 230 starts lowering the moving speed of the reading carriage 116 immediately before the rotational operation begins (time t1), as shown in FIG. 14, and continues lowering the moving speed until the reading carriage 116 stops (time t2>rotational operation beginning time tb). The scanner controller 230 then starts moving the reading carriage 116 at time t3 after the rotational operation ends (time te). At time t4, the moving speed of the reading carriage 116 returns to the original moving speed v1. It should be noted that the CCD sensor 116d does not read the amount of the reflected light while the reading carriage 116 is stopped (period from time t2 to time t3). In addition, although the CCD sensor 116d continues to read the amount of the reflected light during the periods from time t1 to time t2, and from time t3 to time t4, the scanner controller 230 changes the reading cycle of the light amount according to the change in the moving speed of the reading carriage 116 (in proportion to the moving speed.) (Specifically, the slower the moving speed is, the longer the reading cycle becomes.)

As described above, in the example shown in FIG. 14, the controller 200 performs a control so as to interrupt the reading of an image by the reading carriage 116 by first lowering the moving speed of the reading carriage 116 and then stopping the movement of the reading carriage 116, when the printer unit 14 carries out the rotational operation of the YMCK developing unit 50. With this control, of RGB image data obtained by reading an image, the data amount obtained when the rotational operation of the YMCK developing unit 50 is carried out is further reduced. (In the control example shown in FIG. 13, the RGB image data that is obtained when the rotational operation of the YMCK developing unit 50 is carried out is the data that is obtained during the period from time tb to time te, whereas in the control example shown in FIG. 14, the RGB image data that is obtained when the rotational operation of the YMCK developing unit 50 is carried out is the data that is obtained during the period from time tb to time t2 only.) For this reason, the amount of data that is affected by the vibration generated due to the rotational operation is further reduced. It should be noted that in the example shown in FIG. 14, by setting the time to start lowering the moving speed of the reading carriage 116 to an earlier point and by stopping (time t2) the reading carriage 116 before the rotational operation begins (time tb), it is possible not to generate data affected by the vibration. In this respect, the above control is advantageous.

Next, the control example shown in FIG. 15 is described. The scanner controller 230, as shown in FIG. 15, immediately before the rotational operation begins (time t1), starts lowering the moving speed of the reading carriage 116 (as shown in FIG. 15, the position of the reading carriage 116 at which lowering the moving speed of the reading carriage 116 is started is indicated as x1.) Then, the moving speed continues to be lowered (as shown in FIG. 15, the position of the reading carriage 116 at which the reading carriage 116 stops is indicated as x2), until the reading carriage 116 stops (time t2>rotational operation beginning time tb). Thereafter, the scanner controller 230 feeds the reading carriage 116 in a direction reverse to the forward direction during the period from time t2 to time t3, and then makes the reading carriage 116 stop at time t3 (as shown in FIG. 15, the position of the reading carriage 116 at which the reading carriage 116 stops is indicated as x3.) Then, at time t4, the scanner controller 230 starts moving the reading carriage 116 in the forward direction after the rotational operation ends (time te). At time t5, the moving speed of the reading carriage 116 returns to the original moving speed v1 (as shown in FIG. 15, the position of the reading carriage 116 at which the moving speed of the reading carriage 116 returns to the original moving speed v1 is x1.) When the moving speed of the reading carriage 116 is not the normal moving speed v1 (period from time t1 to time t5), the CCD sensor 116d does not read the amount of the reflected light. In other words, the reading carriage 116 performs the reading while moving to the position x1 until time t1, and performs the reading while moving from the position x1 after time t5.

As described above, in the example shown in FIG. 15, the controller 200 performs a control so as to interrupt the reading of an image using the reading carriage 116 by first lowering the moving speed of the reading carriage 116 and then stopping the movement of the reading carriage 116 when the printer unit 14 carries out the rotational operation of the YMCK developing unit 50. Furthermore, the controller 200 restarts the reading after feeding the reading carriage 116 in the reverse direction. With this control, of RGB image data obtained by reading an image, no data obtained during the rotational operation of the YMCK developing unit 50 is generated, and therefore, it is possible to prevent generation of data that is affected by the vibration. Furthermore, since it is not necessary to change the reading cycle of the amount of the reflected light according to the change in the moving speed of the reading carriage 116, or to thin out RGB image data, control can be simple. In this respect, the control is advantageous.

<<<Another Method for Determining Control to Lower Moving Speed of Reading Carriage>>>

Here, another method for determining the control to lower the moving speed of the reading carriage 116 is described with reference to FIG. 16. FIG. 16 is a flow chart showing a method for determining the control to lower the moving speed of the reading carriage 116.

In the foregoing examples, information relating to the control (control information) is stored in the memory 212 of the main controller 210 for each of color mode and monochrome mode, and the main controller 210 determines the control based on information on whether an image formation is performed in color mode or monochrome mode (in other words, selects one of the two types of control information.)

In contrast, in this example, the main controller 210 determines the control based on a reading condition (in this example, reading resolution) for when the reading carriage 116 reads an image, and information on whether an image formation is performed in color mode or monochrome mode. In this case, whether or not to perform the control to lower the moving speed of the reading carriage 116 is also determined based on the reading condition.

This method for determination is described below more specifically.

The main controller 210 refers to information relating to the reading resolution R that is sent from the operation panel 130, and information on whether the image formation is performed in color mode or monochrome mode that is sent from a computer (step S102, step S104 and step S106). When the reading resolution R is high (R≧b) and an image is to be formed in color mode, the main controller 210 selects control information instructing a control to perform the control shown in FIG. 15 five times (step S114). When the reading resolution R is high (R≧b) and an image is to be formed in monochrome mode, the controller selects control information instructing a control to perform the control shown in FIG. 15 twice (step S116). Further, when the reading resolution R is medium (a<R≦b) and an image is to be formed in color mode, the main controller 210 selects control information instructing a control to perform the control shown in FIG. 13 five times (step S110). When the reading resolution R is medium (a≦R<b) and an image is to be formed in monochrome mode, the main controller 210 selects control information instructing a control to perform the control shown in FIG. 13 twice (step S112). Further, when the reading resolution R is low (R<a), the main controller 210 selects not to perform the control to lower the moving speed of the reading carriage 116 (step S108).

In this example, when a high reading quality is required (reading resolution is high), the control that prevents generation of data that is affected by the vibration (namely, the control described in FIG. 15) is performed, when a medium reading quality is required (reading resolution is medium), the control to further reduce the amount of data affected by the vibration (namely, the control described in FIG. 13) is performed, and when a low reading quality is required (reading resolution is low), these controls are not performed.

In other words, the controller 200 determines whether or not to lower the moving speed of the reading carriage 116 that reads an image when the printer unit 14 carries out the rotational operation, based on the reading condition for when the reading carriage 116 reads an image, and determines whether or not to interrupt the reading when the printer unit 14 carries out the rotational operation based on the reading condition (that is, whether or not the control described in FIG. 15 or that in FIG. 13 should be performed.) As a result, the optimal control of the scanner unit 12 when the scanner unit 12 performs a document reading operation concurrently with an operation of the printer unit 14 can be determined according to the required reading quality.

It should be noted that in the above description, the reading resolution was taken as an example of the reading condition, but there is no limitation to this. For example, whether or not to lower the moving speed of the reading carriage 116 that reads an image when the printer unit 14 carries out the rotational operation, or whether or not to interrupt the reading when the printer unit 14 carries out the rotational operation, may be determined based on whether the reading is to be performed in color mode or monochrome mode.

Other Embodiments

An image forming apparatus, for example, according to an embodiment of the present invention is described above, but the foregoing embodiment of the invention is for the purpose of elucidating the present invention and is not to be interpreted as limiting the present invention. The invention can of course be altered and improved without departing from the gist thereof and includes equivalents.

In the foregoing embodiment, an intermediate transfer-type full color laser beam printer is described as an example of the printer unit 14. However, the printer unit 14 may be full color laser beam printers of any type other than the intermediate transfer-type, or monochrome laser beam printers, for example.

In the foregoing embodiment, a case is described in which an image forming operation by the printer unit 14 starts after a document reading operation by the scanner unit 12 is started, and the image forming operation is finished before the document reading operation is finished. However, there is no limitation to this. The present invention is also applicable to a case in which the image forming operation starts before the document reading operation starts. The present invention is also applicable to a case in which the image forming operation is finished after the document reading operation is finished.

In the foregoing embodiment, a case is described in which the scanner function and the second printer function are performed concurrently. However, the present invention is also applicable to cases in which, for example, the scanner function and the first printer function are performed concurrently, the scanner function and the copy function are performed concurrently, the first printer function and the copy function are performed concurrently, and the second printer function and the copy function are performed concurrently. If the MFP apparatus 10 is provided with a fax function, the present invention can be applied to a case in which the fax function and any of the above-described functions are performed concurrently.

In the foregoing embodiment, the controller 200 controls movement of the reading carriage 116 so as to keep the moving speed of the reading carriage 116 slower than the normal speed v1 during the period in which the rotational operation of the YMCK developing unit 50 is carried out. However, there is no limitation to this, and it is possible to control movement of the reading carriage 116 so as to make the moving speed of the reading carriage 116 slower than the normal speed v1 for only part of that period. For example, it is possible to start lowering the moving speed after the rotational operation begins, instead of at the same time as, or before, beginning of the rotational operation.

It should be noted that the foregoing embodiment is more preferable in that it can mitigate in a better manner the problem that reading of a document is not properly performed due to vibration.

In the foregoing embodiment, it is described that the controller 200 lowers the moving speed when the printer unit 14 carries out the rotational operation of the YMCK developing unit 50. However, there is no limitation to this.

Figure 17:
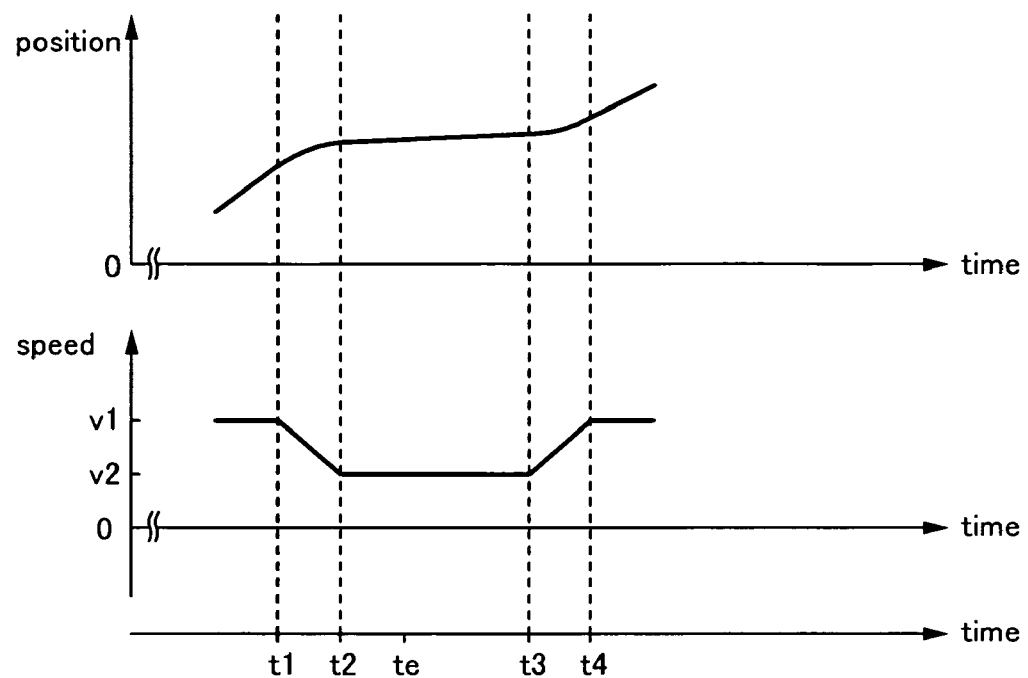
FIG. 17 is a diagram showing another example of the control to lower the moving speed of the reading carriage 116.

For example, as shown in FIG. 17, the controller 200 may lower the moving speed when the printer unit 14 causes the YMCK developing unit 50 to stop rotating. FIG. 17 corresponds to FIG. 13, and shows another example of the control to lower the moving speed of the reading carriage 116 (the time at which the rotation stops is expressed as "te" in FIG. 17.) Instead, the controller 200 may lower the moving speed when the second transferring unit 80 moves and abuts against the intermediate transferring member 70. If the MFP apparatus 10 has a reversing section for carrying a medium toward the second transferring unit with reversing a moving direction of the medium in order to form images on both sides of the medium, the controller 200 may lower the moving speed when the reversing section operates. Further, the controller 200 may control movement of the reading carriage 116 so as to keep the moving speed of the reading carriage 116 slower than the normal speed v1 during the period in which the image forming operation is carried out.

In any of the cases described above, the aforementioned effect, that is, the effect of mitigating the problem that reading of a document is not properly performed due to vibration while preventing the time from when an operator instructs the apparatus to perform image formation to when the operator obtains a medium on which an image has been formed from being prolonged, can be achieved.

===Configuration of Image Forming Systems, Etc.===

Next, an embodiment of an image forming system serving as an example of an embodiment of the present invention is described with reference to the drawings.

Figure 18:
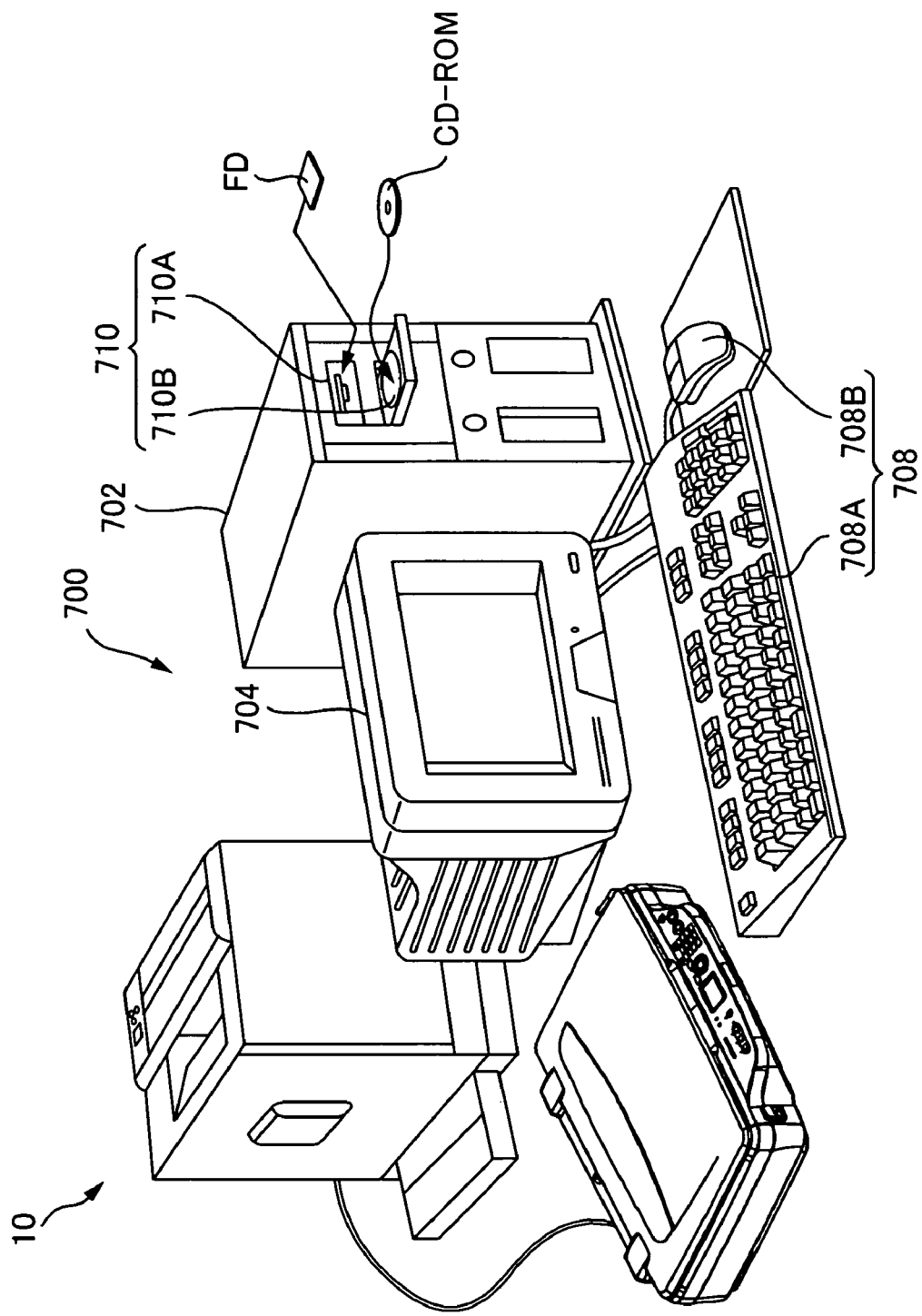
FIG. 18 is an explanatory diagram showing the external configuration of an image forming system.

FIG. 18 is an explanatory diagram showing the external configuration of the image forming system. An image forming system 700 is provided with a computer 702, a display device 704, the MFP apparatus 10, an input device 708, and a media reading device 710. In this embodiment, the computer 702 is accommodated within a mini-tower type housing. However, there is no limitation to this. A CRT (cathode ray tube), plasma display, or liquid crystal display device, for example, is generally used as the display device 704, but there is no limitation to this. In this embodiment, the input device 708 is a keyboard 708A and a mouse 708B, but there is no limitation to these. In this embodiment, a flexible disk drive 710A and a CD-ROM drive 710B are used as the reading device 710, but there is no limitation to these, and the media reading device 710 may also be a MO (magnet optical) disk drive or a DVD (digital versatile disk), for example.

Figure 19:
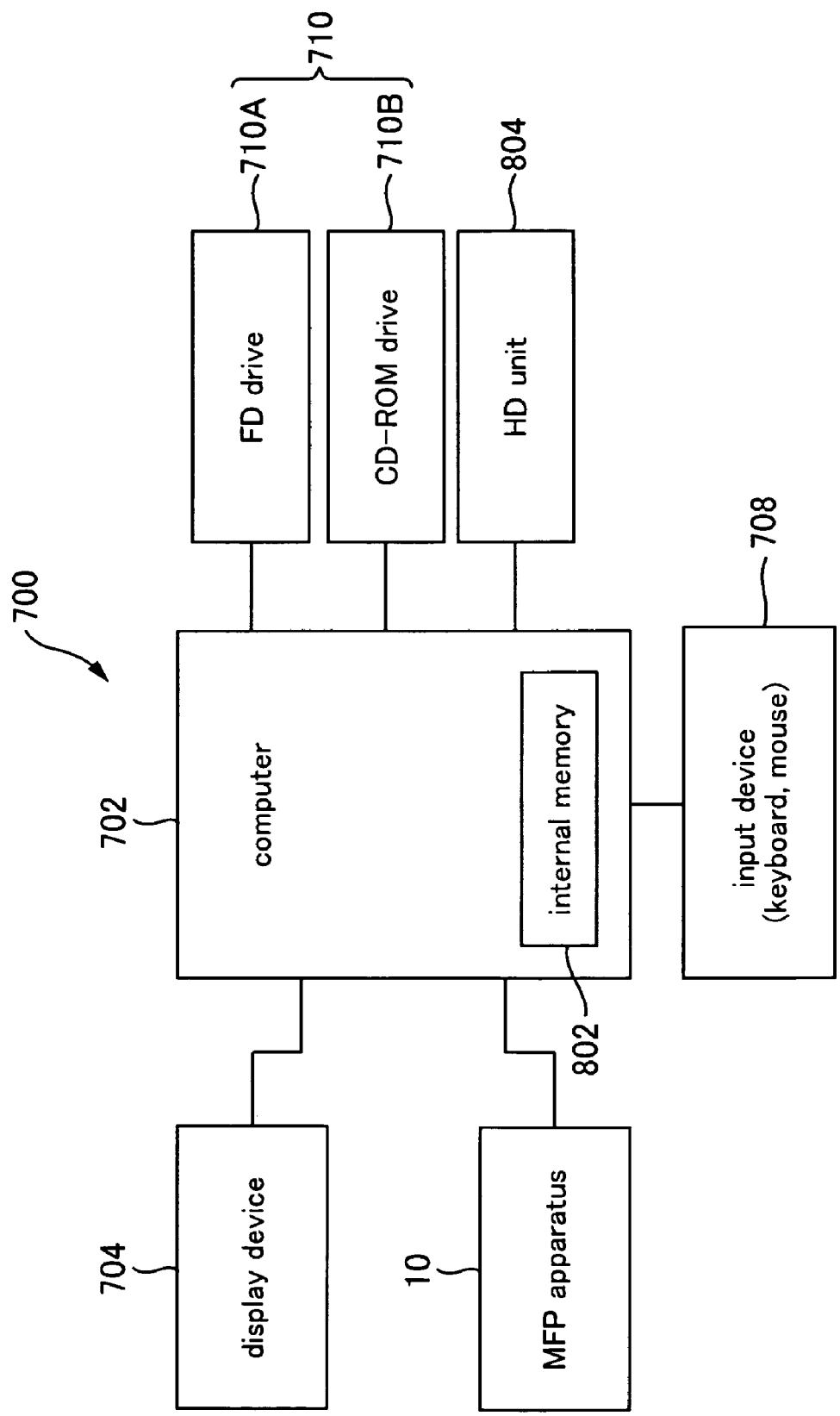
FIG. 19 is a block diagram showing the configuration of the image forming system shown in FIG. 18.

FIG. 19 is a block diagram showing the configuration of the image forming system shown in FIG. 18. An internal memory 802 such as a RAM is provided within the housing accommodating the computer 702, and also an external memory such as a hard disk drive unit 804 is provided.

In the above description, an example was described in which the image forming system is constituted by connecting the MFP apparatus 10 to the computer 702, the display device 704, the input device 708, and the media reading device 710, but there is no limitation to this. For example, the image forming system can be made of the computer 702 and the MFP apparatus 10, and the image forming system does not have to be provided with all of the display device 704, the input device 708, and the media reading device 710.

It is also possible for the MFP apparatus 10 to have some of the functions or mechanisms of the computer 702, the display device 704, the input device 708, and the media reading device 710. For example, the MFP apparatus 10 may also include a display section for carrying out various displays, and a media attachment/detachment section to and from which recording media storing image data captured by a digital camera or the like are inserted and taken out.

As an overall system, the image forming system that is thus achieved is superior to conventional systems.

What is claimed is:

1. An image forming apparatus comprising:
   an image forming section for forming an image;
   a document reading section capable of reading a document concurrently with an operation of the image forming section, the document reading section reading the document by successively shifting a reading position; and
   a controller that lowers a speed for shifting the reading position in the document reading section when the image forming section carries out a predetermined operation, wherein
   the document reading section is provided with a moving member for reading an image on the document while moving, and
   when the image forming section carries out the predetermined operation, the controller first lowers the moving speed and then stops the movement of the moving member, to interrupt the reading of the image by the moving member.

2. An image forming apparatus according to claim 1, wherein the controller determines whether or not to interrupt the reading when the image forming section carries out the predetermined operation, based on a reading condition for when the moving member reads the image.

3. An image forming apparatus according to claim 1, wherein the controller restarts the reading after feeding the moving member in a reverse direction.

4. An image forming apparatus according to claim 2, wherein the reading condition is a reading resolution.

5. An image forming apparatus according to claim 1, wherein the image forming section includes
   an image bearing member for bearing a latent image,
   a plurality of developing devices for developing the latent image, and
   a rotation section that holds the plurality of developing devices and that rotates to move the developing devices and make a selected one of the developing devices oppose the image bearing member, and
   wherein the predetermined operation is a rotational operation of the rotation section.

6. An image forming apparatus according to claim 1, wherein
   the image forming section includes an image bearing member for bearing a latent image,
   a plurality of developing devices for developing the latent image, and
   a rotation section that holds the plurality of developing devices and that rotates to move the developing devices and make a selected one of the developing devices oppose the image bearing member, and
   wherein the predetermined operation is an operation to stop the rotation of the rotation section.

7. An image forming apparatus comprising:
   an image forming section for forming an image;
   a document reading section capable of reading a document concurrently with an operation of the image forming section, the document reading section reading the document by successively shifting a reading position; and
   a controller that lowers a speed for shifting the reading position in the document reading section when the image forming section carries out a predetermined operation, wherein the controller starts lowering the speed for shifting the reading position in the document reading section at the same time as starting of the predetermined operation or before starting of the predetermined operation, wherein the document reading section is provided with a moving member for reading an image on the document while moving, wherein, when the image forming section carries out the predetermined operation, the controller lowers a moving speed of the moving member that reads the image, wherein the controller determines whether or not to lower the moving speed of the moving member that reads the image when the image forming section carries out the predetermined operation, based on a reading condition for when the moving member reads the image, wherein, when the image forming section carries out the predetermined operation, the controller first lowers the moving speed and then stops the movement of the moving member, to interrupt the reading of the image by the moving member, wherein the controller determines whether or not to interrupt the reading when the image forming section carries out the predetermined operation, based on a reading condition for when the moving member reads the image, wherein the controller restarts the reading after feeding the moving member in a reverse direction, wherein the reading condition is a reading resolution, wherein the image forming section includes an image bearing member for bearing a latent image, a plurality of developing devices for developing the latent image, and a rotation section that holds the plurality of developing devices and that rotates to move the developing devices and make a selected one of the developing devices oppose the image bearing member, and wherein the predetermined operation is a rotational operation of the rotation section.

8. An image forming system comprising:

a computer; and an image forming apparatus that is connectable to the computer and that includes an image forming section for forming, an image, a document reading section capable of reading a document concurrently with an operation of the image forming section, the document reading section reading the document by successively shifting a reading position, and a controller that lowers a speed for shifting the reading position in the document reading section when the image forming section carries out a predetermined operation, wherein the document reading section is provided with a moving member for reading an image on the document while moving, and when the image forming section carries out the predetermined operation, the controller first lowers the moving speed and then stops the movement of the moving member, to interrupt the reading of the image by the moving member.

* * * * *